Feb. 6, 1962 H. W. FRENCH, JR., ET AL 3,019,708
MICROSCOPE STAGES
Filed June 17, 1959 2 Sheets-Sheet 2

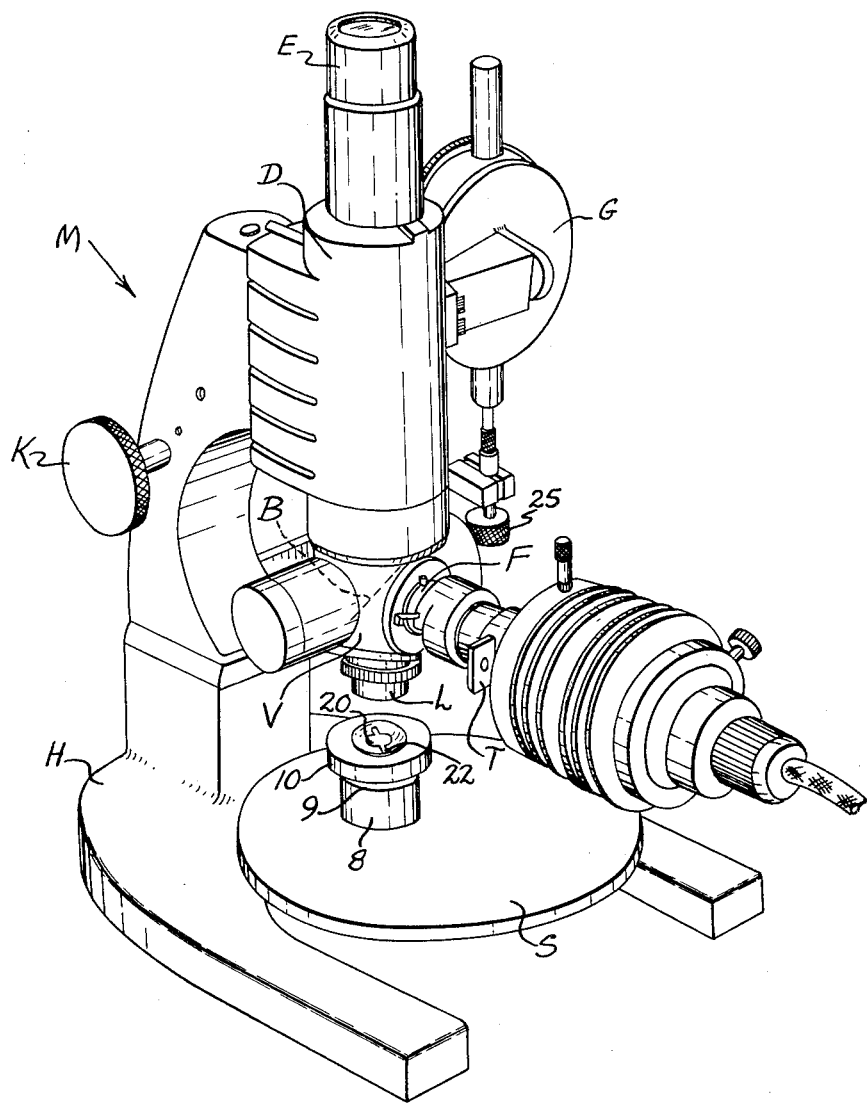

INVENTORS
HOBERT W. FRENCH, JR.
HOWARD A. MAIER
JACK L. BROOKHART
BY
Herbert C Kimball
ATTORNEY

United States Patent Office 3,019,708
Patented Feb. 6, 1962

3,019,708
MICROSCOPE STAGES
Hobert W. French, Jr., Colden, Howard A. Maier, Williamsville, and Jack L. Brookhart, Tonawanda, N.Y., assignors to American Optical Company, Southbridge, Mass., a voluntary association of Massachusetts
Filed June 17, 1959, Ser. No. 820,905
5 Claims. (Cl. 88—39)

This invention relates to microscopic examination of curved surfaces, such as the spherical surfaces of contact lenses, to determine the surface's radius of curvature. More particularly, this invention has for an object to provide on a microscope stage a mount or support for the object such as a contact lens with a curved surface or surfaces which is to be microscopically examined.

It is well known to microscope users that the radius of curvature of a surface may be determined by using the surface to reflect the image of a target, which image is projected through the objective of the microscope onto the surface being studied. The usual microscope stage which is primarily intended for the support of flat objects such as slides, is not adapted for positioning objects with spherical surfaces. Moreover, when bringing into focus in the eyepiece of the microscope the image reflected from the surface under study, the accurate focusing of the image is rendered more difficult unless precautions are taken to eliminate the reflection from a second surface, as for instance with a thin lens. The present invention provides a mount which permits manipulation of a contact lens so as to present the surface to be studied in the proper relation to the microscope. Provision can also be made for wetting the second surface of a lens so as to eliminate the reflection of an image from this second surface.

In the drawings:

FIG. 1 illustrates diagrammatically the arrangement of a microscope for taking the desired measurement of the radius of curvature of a surface.

Figure 3:
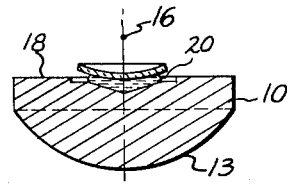
FIG. 3 is a sectional view through the axis of a mount used to support the convex surface of a contact lens.
Figure 2:
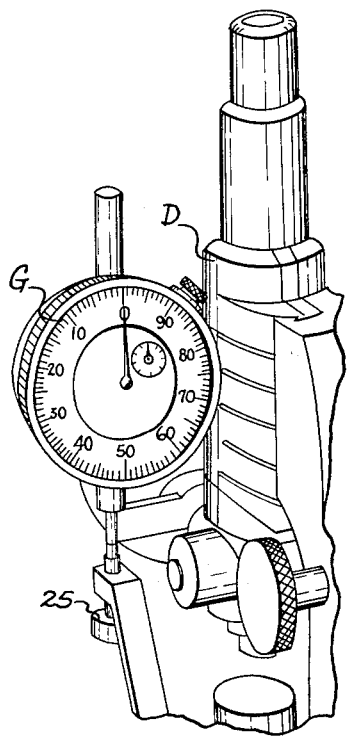
FIG. 2 is a perspective view of a portion of a microscope such as shown in FIG. 1, but taken from the opposite side of the instrument.

Referring to FIG. 1 of the drawings, the arrangement of the microscope for taking the desired measurements will first be described to render the features of the present invention more readily understood. With the microscope M, having the focusing knob K and the eyepiece E has been assembled a vertical illuminator V having a slide T. This slide T preferably mounts two targets, a large aperture target for general use with surfaces and a small aperture target for use with restricted surfaces (see FIG. 5). If desired a filter F may be inserted in the vertical illuminator to impart the desired intensity and/or color to the image of the target. The use of the vertical illuminator involves inserting a beam splitter B in the optical system of the microscope. Accordingly, the image of the target illuminated by the lamp of the vertical illuminator is brought to a focus in a plane which is a predetermined distance below the objective L of the microscope. Should a reflecting surface, such as the surface of the object under study, be positioned in the aforesaid plane, the image of the target would be brought to a focus on it. This image would be visible in the eyepiece E.

There is also a second plane in which the reflecting surface may be positioned for rendering the image of the target visible in the eyepiece E, provided the reflecting surface has such spherical curvature as to participate in the formation of the said image. It can be demonstrated that the separation between these two planes is exactly the radius of curvature of the reflecting surface, the second plane being below the first when the reflecting surface is concave and the second plane being above the first when the reflecting surface is convex.

These principles explain the considerations which are controlling in the manipulation of the object under study, and the problems which are to be met in providing a mount or support on the microscope stage S for the object to be studied, such as a contact lens. When a concave surface is studied, the object should be positioned near the general level of the stage. The microscope objective L will be in the lower portion of its range for the first setting, and will be raised for the second setting. On the contrary, the object should be positioned in a raised position when a convex surface is studied. The objective L will be in the upper portion of its range for the first setting, and will be lowered to the middle portion of its range for the second setting.

As a means of mounting the object to be studied, I have provided on the stage S a lens mount support 8 having a spherical recess 9 at its top. Two mounts 10 and 12 are adapted to cooperate with this spherical recess 9. The mount 10 is for use in the lower range as described in the preceding paragraph, and has a spherical convex bottom 13 which has approximately the same radius of curvature as the recess 9 so that one conforms to the other. Lubricant such as petroleum jelly promotes the smooth operation of the mount. The mount 12 is for use in the upper range of the objective L; and has a spherical bottom 15 to fit the recess 9. Its top 17 is conical as shown to provide a more elevated position for the lens or the like being examined.

Where the mounts 10 and 12 are to be used primarily for manipulating contact lenses, the radius of spherical curvature for the surfaces 13 and 15 is arrived at in relation to the average radius of curvature of contact lenses. Referring to FIGURE 3, it will be noted that the center of curvature of the spherical surface 13 is at 16 and that the center of curvature of an average contact lens seated on the mount 10 is also at 16. Accordingly, the surface of the contact lens so mounted is substantially at a constant distance from the center 16 in spite of being shifted laterally as the mount 10 is shifted in the spherical recess 9. This is of importance because various parts of the same spherical surface on a contact lens may be examined without substantial change in the focusing mechanism of the microscope.

Figure 4:
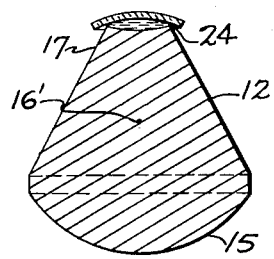
FIG. 4 is a similar section view of a mount used to support the concave surface of such a lens.

Referring to FIGURE 4 it will be noted that the center of curvature of the spherical surface 15 is at 16' and that the center of curvature of an average contact lens seated (in inverted position) on the mount 12 is also at 16'. Accordingly, the surface of the contact lens so mounted is substantially at a constant distance from the center 16' in spite of being shifted laterally as the mount 12 is shifted in the spherical recess 9. In other words, the center 16' does not change its position, and shifting a new portion of the contact lens into alignment with the optical axis of the microscope is done arcuately with the radius of the arc equal to the radius of curvature of the contact lens.

The top 18 of the mount 10 is relatively flat and is provided with a rounded depression 20 adapted to receive and position the convex face of a lens or similar object. The depression 20 has a further function in that a small quantity of water or saline solution deposited in the depression will wet the bottom surface of the lens whereby the unwanted reflection from this bottom surface is avoided. As a further refinement I may extend a vertical kerf 22 across a diameter of the depression 20 to aid in removal of a lens from the mount 10.

As the mount 12 is used when examining the convex face of the object, this mount is provided with a relatively small circular seat 24 at the top of the cone 17 for engaging the concave face of the object. Water or saline solution in the seat 24 removes the unwanted second reflection from this concave face.

Figure 5:
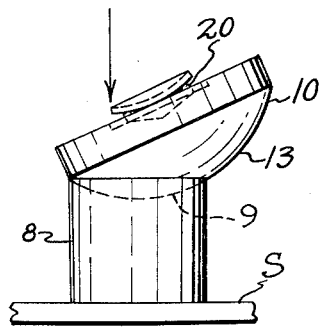
FIG. 5 is a view in side elevation showing how a mount such as shown in FIG. 3 may be oriented to present a marginal portion of the contact lens for study.

FIG. 5 illustrates the use of a mount when examining a portion of the lens away from its center. By changing the orientation of the mount in the recess 9 and by shifting the stage S, any selected portion of a lens surface may be subjected to inspection or measurement. For this purpose it is preferable to use a stage of the glide type in which two flat plates are separated by a layer of petroleum jelly.

The operator can count the number of turns of the focusing knob K required to change from the setting in which one image of the target is in focus to the setting in which the other image of the target is in focus, and thereby determine the distance between the two image planes. A considerably more convenient arrangement is to employ a gage G as shown, which has a dial for indicating the amount of relative movement between the body tube D and the base H of the microscope.

For greater simplicity in reading the gage G, an adjustment screw 25 is introduced between the gage G secured to the body tube D and the bracket 27 (forming part of the base) with which the gage G cooperates. This adjustment screw permits a setting of the gage G at zero when one of the two images above referred to is in clear focus. The separation between the plane of this image and the plane of the second image can now be read directly from the gage G in view of the zero setting for the first image. This reading is of course the desired radius of curvature as above explained.

In making a determination of the radius of curvature of a surface of a contact lens, the flat top mount 10 is used for holding a lens with the concave face uppermost. To do away with the unwanted reflection from the lower face, water or saline solution is placed beneath the lens in the depression 20. The large aperture target is aligned with the axis of the vertical illuminator, and an image of this target is brought to optimum focus on the surface of the lens. This will be near the lower limit of the range of the objective L. At this time the mount 10 should be leveled and the stage S manipulated to bring the lens directly below the objective L. By looking through the eyepiece E and making use of the focusing knob K the optimum focus of the target image can be obtained. The gage should be read, or if more convenient, its dial can be set at zero by means of the adjustment screw 25 for this first setting of the microscope.

The knob K is now turned to bring the second image of the target into focus, which should occur at some setting more elevated than the first. After obtaining optimum focus, a reading of the gage is taken, and the difference between the two readings is the desired radius of curvature.

For determinations of surface curvature of portions of the lens away from its center, the mount is reoriented in the recess 9 (see FIG. 5 for instance) while the stage S is held stationary. With the surface being examined normal to the optical axis of the microscope, the image of the target is reflected back along the optical axis. While this secondary curve area can generally be more easily located and centered when the large aperture target is used, it may be found desirable to use the small aperture target for the actual measurement. This is because its field of view is restricted to an area more nearly that of the secondary curve, and therefore the possibility of confusion between two out of focus images, both visible at the same setting, is eliminated. The steps followed in making the two settings are then the same as for determinations adjacent the center of the lens.

In making a determination of the radius of curvature of the convex face of a contact lens, the conical top mount 12 is used for supporting the lens. Water or saline solution may be used in the seat 24 so as to avoid the unwanted second reflection. The circular seat 24 at the top of the cone engages the concave face of the lens; and due to the height of the cone 17, the setting arrived at by focusing an image of the target on the lens surface itself is in the upper range of the objective L. The mount 12 should be adjusted to level the lens surface, and the stage S manipulated to bring the lens center directly below the objective L. The target image is then brought into optimum focus and the first reading taken. The body tube of the microscope is then lowered to bring the second image of the target into focus. When the optimum focus is obtained, the second reading is taken, and the difference between the two readings is the desired radius of curvature. To avoid a negative reading where a gage is used, the order of the settings may be reversed so that the lower of the two settings is the first setting.

The use of a mount or support embodying my invention facilitates the rapid and accurate determination of the surface curvatures under consideration. Not only is it possible to avoid the unwanted second reflection as above described, but the positioning of the lens surface for scrutiny in proper relation to the microscope is accomplished with greater ease and speed.

We claim:

1. In a microscope, in combination, a housing carrying an optical system including an objective and an eyepiece, means including a target and a vertical illuminator for projecting an image of said target along the axis of said optical system, a stage, focusing means for adjusting the separation of said housing and stage to focus the microscope for viewing an object on said stage, a gage for indicating changes in the separation of said stage and objective, and a mount for supporting a contact lens, said stage having a spherical socket for receiving a mating surface on said mount, the radius of curvature of said socket being so related to the position of an average lens carried by the mount that the center of curvature of said socket substantially coincides with the center of curvature of said lens to afford universal adjustment of the contact lens without altering the normal relation of its surface to the optical axis of the microscope.

2. In a microscope, the combination with a housing carrying an optical system including an objective and an eyepiece, means including a target and a vertical illuminator for projecting an image of said target along the axis of said optical system, a support, focusing means for adjusting the separation of said housing and support and a gage for indicating changes in the separation of said support and housing, of a contact lens mount having a spherical bottom received in a correspondingly shaped recess in said support, said mount having a seat for a contact lens so related to the said spherical bottom that the center of curvature of said spherical bottom substantially coincides with the center of curvature of an average lens carried on said seat thereby affording universal adjustment of said lens without altering the normal relation of the optical axis of the microscope to the surface of said lens.

3. In a microscope, the combination with a housing, an optical system carried thereby including an objective and an eyepiece, means including a target and a vertical illuminator for projecting an image of said target along the axis of said optical system, a support having a spherical recess therein, focusing means for adjusting the separation of said housing and support and a gage for indicating changes in the separation of said support and housing, of a contact lens mount having a bottom portion conforming to and received in the spherical recess in said support, the center of curvature of said spherical bottom being located within said mount, said mount having a domed seat for a contact lens with the spacing between said domed seat and the center of curvature of said spherical bottom substantially equal to the radius of curvature of an average contact lens.

4. In a microscope, the combination with a housing, an optical system carried thereby including an objective and an eyepiece, means including a target and a vertical illuminator for projecting an image of said target along the axis of said optical system, a support having a spherical recess therein, focusing means for adjusting the separation of said housing and support and a gage for indicating changes in the separation of said support and housing, of two contact lens mounts having a bottom portion conforming to the spherical recess in said support for alternative cooperation with said recess, each of said mounts having in spaced relation to said spherical bottom a seat for a contact lens, the lens seat of one of said mounts being a rounded depression for receiving and positioning a convex spherical surface of a contact lens and the lens seat of the other of said mounts being domed for engaging a concave spherical surface of a contact lens, the spacing of said seats relative to the spherical bottoms of their respective mounts being so arranged that the center of curvature of each bottom substantially coincides with the center of curvature of an average contact lens mounted on its respective seat.

5. In a microscope, in combination, a body tube carrying optical system including an objective and an eyepiece, means including a target and a vertical illuminator for projecting an image of said target along the axis of said optical system to impinge upon a surface under examination through the microscope, an adjustable stage for centering an object relative to said optical axis, focusing means for adjusting the separation of said stage and body tube to focus the microscope for viewing an object on said stage, a gage carried by said body tube for indicating changes in the separation of said stage and body tube, and a mount having a seat for engaging and supporting a contact lens, said mount being carried in a spherical socket on said stage so as to afford universal adjustment of the orientation of the surface of a contact lens supported by said mount, said seat being so arranged with respect to said spherical socket that the center of curvature of said socket substantially coincides with the center of curvature of an average contact lens mounted on its respective seat.

References Cited in the file of this patent

FOREIGN PATENTS

| | | |
|---|---|---|
| 1,030,286 | France | Mar. 11, 1953 |
| 915,991 | Germany | Aug. 2, 1954 |

OTHER REFERENCES

Laycock: "A Micolens Measuring Aid," American Journal of Optometry and Archives, vol. 34, No. 10, October 1957, pages 538 and 539.